(12) United States Patent
Igarashi et al.

(10) Patent No.: US 8,018,548 B2
(45) Date of Patent: Sep. 13, 2011

(54) LIQUID CRYSTAL DISPLAY DEVICE

(75) Inventors: Kazuaki Igarashi, Hakusan (JP);
Hisanori Futaki, Himeji (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 909 days.

(21) Appl. No.: 12/016,418

(22) Filed: Jan. 18, 2008

(65) Prior Publication Data

US 2008/0211985 A1 Sep. 4, 2008

(30) Foreign Application Priority Data

Feb. 5, 2007 (JP) ................................. 2007-025818

(51) Int. Cl.
*G02F 1/1333* (2006.01)
(52) U.S. Cl. ............... 349/58; 349/56; 349/41; 349/149
(58) Field of Classification Search .................... 349/58, 349/56, 41, 61, 139, 141, 149, 150, 151, 349/152
See application file for complete search history.

(56) References Cited

U.S. PATENT DOCUMENTS

| 5,838,412 | A | * | 11/1998 | Ueda et al. ..................... 349/150 |
| 5,959,709 | A | * | 9/1999 | Asada et al. .................. 349/150 |
| 5,963,287 | A | * | 10/1999 | Asada et al. .................. 349/150 |
| 2004/0027508 | A1 | * | 2/2004 | Akiyama et al. ................ 349/56 |
| 2008/0211985 | A1 | * | 9/2008 | Igarashi et al. ................. 349/58 |

FOREIGN PATENT DOCUMENTS

JP 2006-180119 7/2006

* cited by examiner

*Primary Examiner* — Brian M Healy
(74) *Attorney, Agent, or Firm* — Finnegan, Henderson, Farabow, Garrett & Dunner, L.L.P.

(57) ABSTRACT

A liquid crystal display device includes a liquid crystal display panel PNL including a pair of mutually opposed substrates, a display section which is composed of a plurality of matrix-arrayed display pixels, and a peripheral region surrounding the display section, a driving circuit, which drives the display pixels, a controller which controls the driving circuit, and a power supply circuit which supplies power to the driving circuit and the controller, wherein the controller and the power supply circuit are built in a 1-chip system IC and are disposed on the peripheral region.

4 Claims, 5 Drawing Sheets

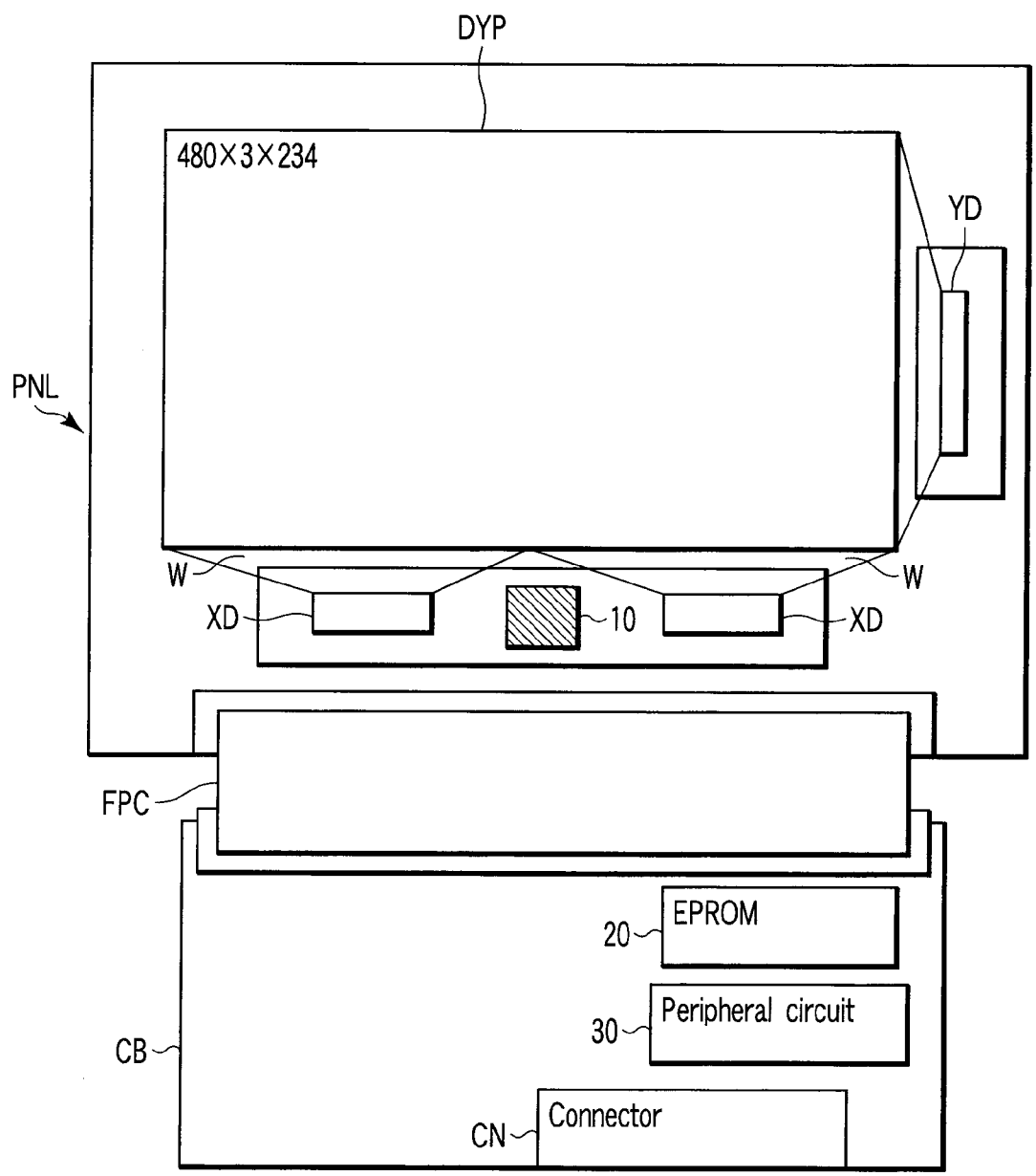
F I G. 1

LIQUID CRYSTAL DISPLAY DEVICE

CROSS-REFERENCE TO RELATED APPLICATIONS

This application is based upon and claims the benefit of priority from prior Japanese Patent Application No. 2007-025818, filed Feb. 5, 2007, the entire contents of which are incorporated herein by reference.

BACKGROUND OF THE INVENTION

1. Field of the Invention

The present invention relates generally to a liquid crystal display device, and more particularly to an active matrix liquid crystal display device.

2. Description of the Related Art

A liquid crystal display device has various features such as small thickness, light weight and low power consumption, and is applied to various uses, e.g. OA equipment, information terminals, timepieces, and TVs. In particular, a liquid crystal display device comprising thin-film transistors (TFTs) has high responsivity and, therefore, it is used as a monitor of a mobile TV, a computer, etc., which displays a great deal of information.

In general, the liquid crystal display device includes a liquid crystal display panel, a driving IC which drives the liquid crystal display panel, a controller which controls the driving IC, and a power supply circuit which supplies power to the controller and the driving IC.

In the prior art, there has been proposed a liquid crystal display panel in which a controller and a power supply circuit, for instance, are integrated in one chip, and control signals, etc. are input to a liquid crystal display panel from the outside of a liquid crystal panel module (see Jpn. Pat. Appln. KOKAI Publication No. 2006-180119).

However, in the case where the controller and the power supply circuit are disposed outside the liquid crystal display panel, as described above, the number of components increases. It is thus difficult to reduce the manufacturing cost, and the reliability may deteriorate.

BRIEF SUMMARY OF THE INVENTION

The present invention has been made in consideration of the above-described problem, and the object of the invention is to provide a liquid crystal display device with a reduced manufacturing cost and an improved reliability.

According to an aspect of the present invention, there is provided a liquid crystal display device comprising: a liquid crystal display panel including a pair of mutually opposed substrates, a display section which is composed of a plurality of matrix-arrayed display pixels, and a peripheral region surrounding the display section; a driving circuit which drives the display pixels; a controller which controls the driving circuit; and a power supply circuit which supplies power to the driving circuit and the controller, wherein the controller and the power supply circuit are built in a 1-chip system IC and are disposed on the peripheral region.

The present invention can provide a liquid crystal display device with a reduced manufacturing cost and an improved reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows an example of the structure of a liquid crystal display device according to a first embodiment of the present invention;

DETAILED DESCRIPTION OF THE INVENTION

Figure 2:
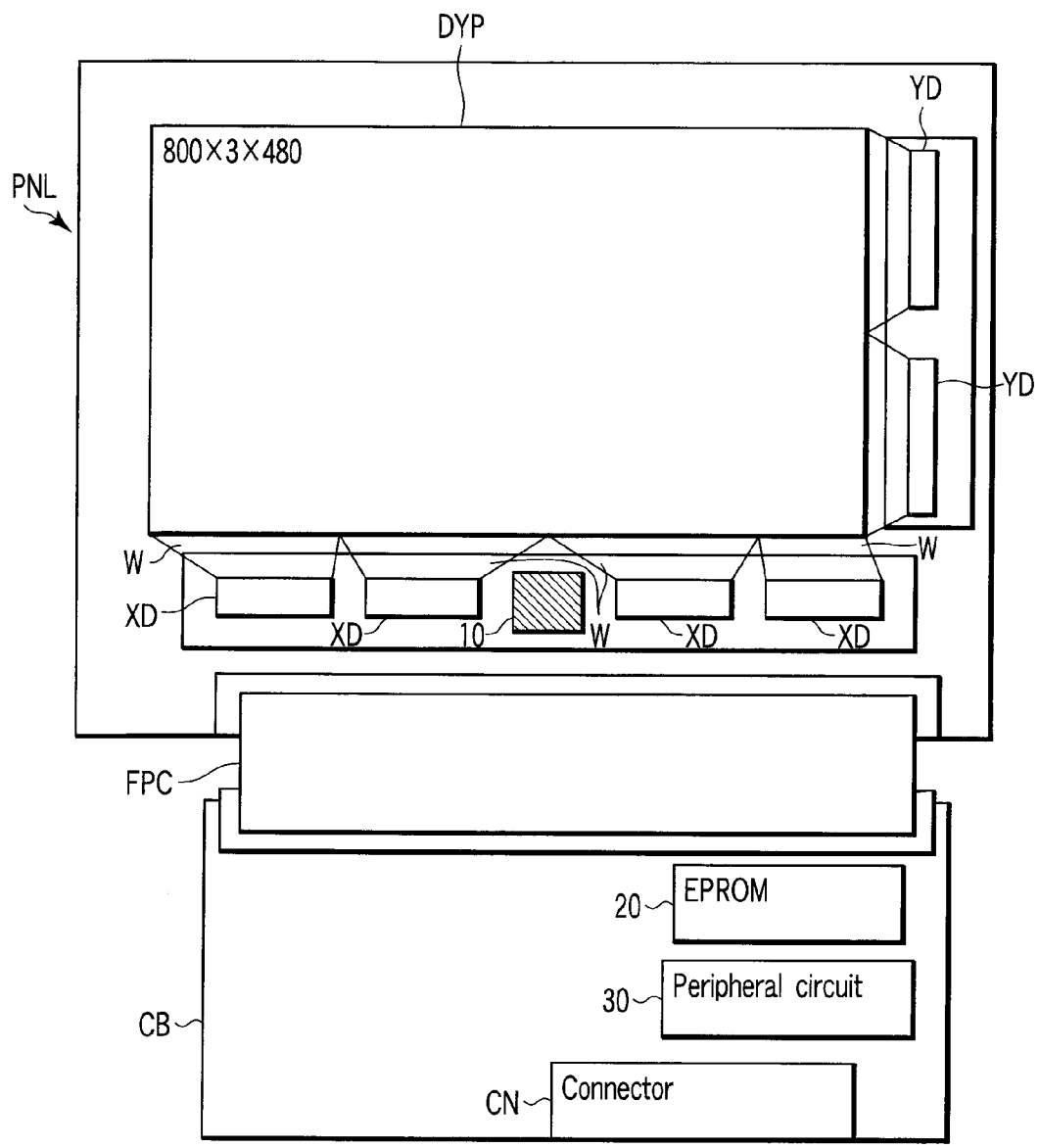
FIG. 2 schematically shows another example of the structure of the liquid crystal display device according to the first embodiment of the invention.

A liquid crystal display device according to a first embodiment of the present invention will now be described with reference to the accompanying drawings. As shown in FIG. 1, the liquid crystal display device according to this embodiment includes a liquid crystal display panel PNL.

A circuit board CB is electrically connected to one end portion of the liquid crystal display panel PNL via a flexible board FPC. In the liquid crystal display device according to this embodiment, an EPROM (erasable programmable read-only memory) 20, a peripheral circuit 30 and a connector CN are mounted on the circuit board CB.

The liquid crystal display panel PNL includes a pair of mutually opposed substrates, namely, an array substrate and a counter-substrate, and a display section DYP which is composed of a plurality of matrix-arrayed display pixels (not shown). Scanning lines (not shown), which are arranged along rows of the display pixels, and signal lines (not shown), which are arranged along columns of the display pixels, are disposed on the display section DYP.

A driving circuit and a system IC 10 are disposed on a peripheral region which surrounds the display section DYP. In the liquid crystal display device according to the present embodiment, the system IC is disposed on the array substrate by a COG (Chip On Grass bonding) process. The driving circuit includes, as circuit sections, a scanning line driving circuit YD which is connected to the scanning lines, and a signal line driving circuit XD which is connected to the signal lines. In the liquid crystal display device according to this embodiment, one scanning line driving circuit YD and two signal line driving circuit XD are disposed on the peripheral region.

A timing controller TCNT which controls the scanning line driving circuit YD and signal line driving circuits XD, a power supply circuit DD which supplies power to the scanning line driving circuit YD and signal line driving circuits XD, a counter-voltage output circuit and a γ voltage generating circuit are mounted in the system IC 10 according to this embodiment.

The values of a γ potential VREF and a counter-potential VCOM of the system IC 10 can be varied, for example, by register values that are written in the EPROM 20. The peripheral circuit 30 includes, for example, a capacitor for a power supply circuit, a protection circuit such as a fuse, a damping resistor for an input/output signal (or a panel wiring resistor), a resistor for controlling the system IC, a bypass capacitor, etc.

In the liquid crystal display device according to the present embodiment, the system IC 10 is COG-mounted between the two signal line driving circuits XD on the peripheral region of the liquid crystal display panel PNL. Specifically, a plurality of connection wiring lines W are disposed between the signal line driving circuits XD and the display section DYP. These plural connection wiring lines W extend from the signal line driving circuits XD and are connected to the signal lines of the display section DYP.

The system IC 10 is disposed along an end side of the display section DYP and is positioned on a region between the signal line driving circuits XD, where the connection wiring lines W are not disposed.

Figure 3:
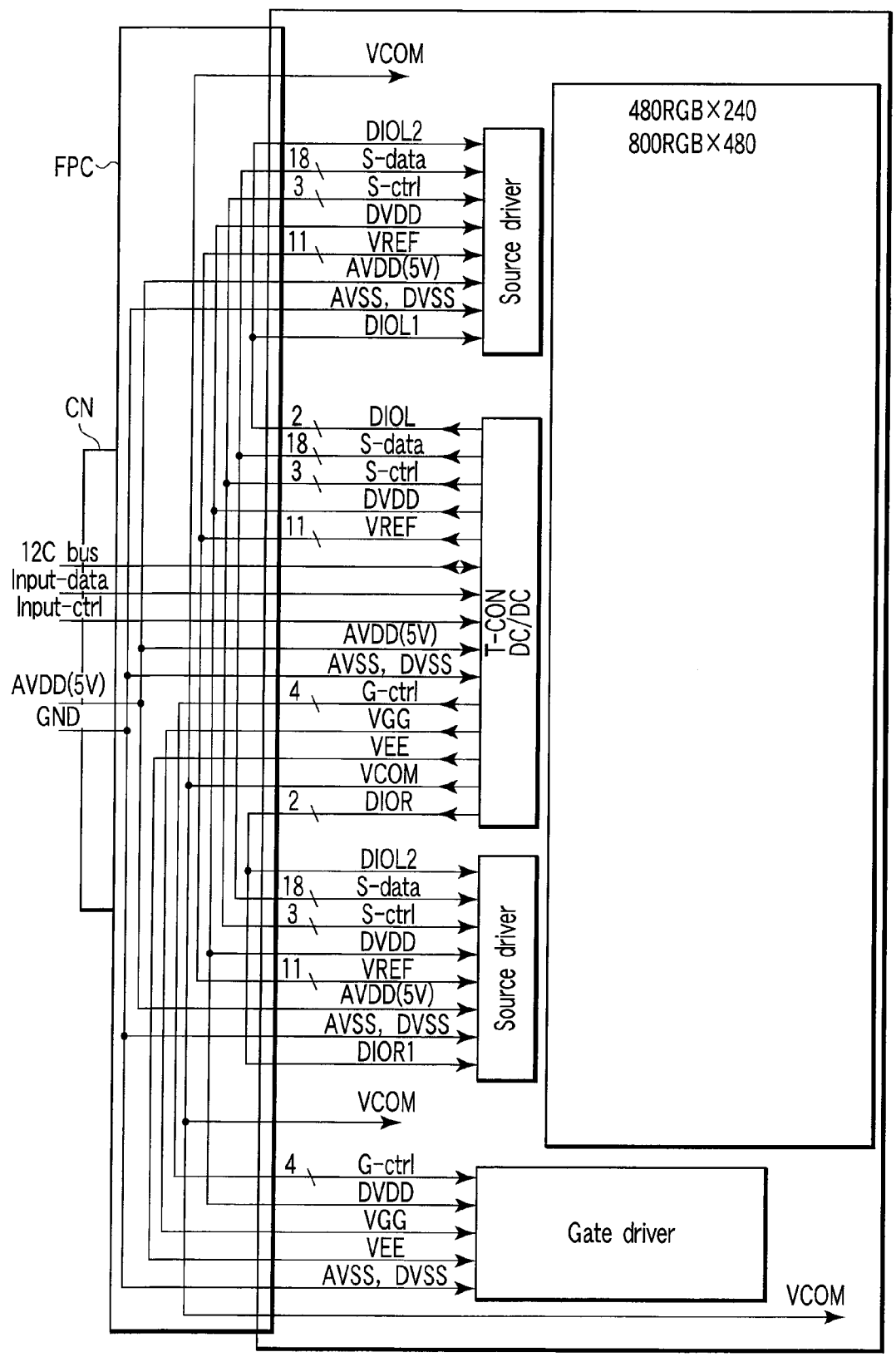
FIG. 3 is a view for explaining an example of the configuration of wiring lines in the liquid crystal display device according to the first embodiment of the invention.

In the liquid crystal display device according to the present embodiment, wiring lines for supplying signals to the system IC 10, scanning line driving circuit YD and signal line driving circuits XD are arranged as shown in FIG. 3. Specifically, a power supply voltage AVDD, video data Input-data, etc. are input from the circuit board CB to the liquid crystal display panel PNL via the flexible board FPC.

The power supply voltage AVDD, video data Input-data, control data Input-ctrl, etc., which are input from the circuit board CB, are delivered to the system IC 10. On the basis of these signals, the system IC 10 outputs a gate-on potential VGG, a gate-off potential VEE, a γ potential VREF, a counter-potential VCOM, driving circuit control signals G-ctrl and S-ctrl, etc.

In the case of the liquid crystal display device of this embodiment, the system IC 10 is disposed on the region between the two signal line driving circuits XD. Thus, even in the case where the system IC 10 is disposed on the peripheral region of the liquid crystal display panel PNL, there is no need to increase the size of the peripheral region.

In addition, in the liquid crystal display device according to this embodiment, the system IC 10, in which the controller CNT and power supply circuit DD are integrated as one chip, is used. For example, in the case where the number of scanning lines and the number of signal lines, which are disposed in the display section DYP, are increased as shown in FIG. 2, if use is made of a system IC in which a driving circuits, a controller CNT and a power supply circuit DD are integrated as one chip, the number of controllers CNT and the number of power supply circuits DD have to be also increased in order to increase the number of driving circuits.

By contrast, in the case of the liquid crystal display device according to this embodiment, it should suffice if the number of scanning line driving circuits and the number of signal line driving circuits, which are disposed on the peripheral region, are increased. There is no need to increase the number of controllers CNT and the number of power supply circuits DD.

Moreover, in the liquid crystal display device according to this embodiment, since the system IC 10 is positioned substantially at a central area in the longitudinal direction of the display section DYP, it is possible to suppress the influence of, for example, a voltage drop due to wiring resistance upon the signals and power that are output from the system IC.

Therefore, the present embodiment can provide a liquid crystal display device wherein the number of components, which are necessary for the fabrication of the liquid crystal display device, can be reduced, and thereby the reduction in manufacturing cost and the improvement in the reliability can be realized.

Next, a liquid crystal display device according to a second embodiment of the present invention is described with reference to the accompanying drawings. The structural parts common to those in the liquid crystal display device of the above-described first embodiment are denoted by like reference numerals, and a description thereof omitted here.

Figure 4:
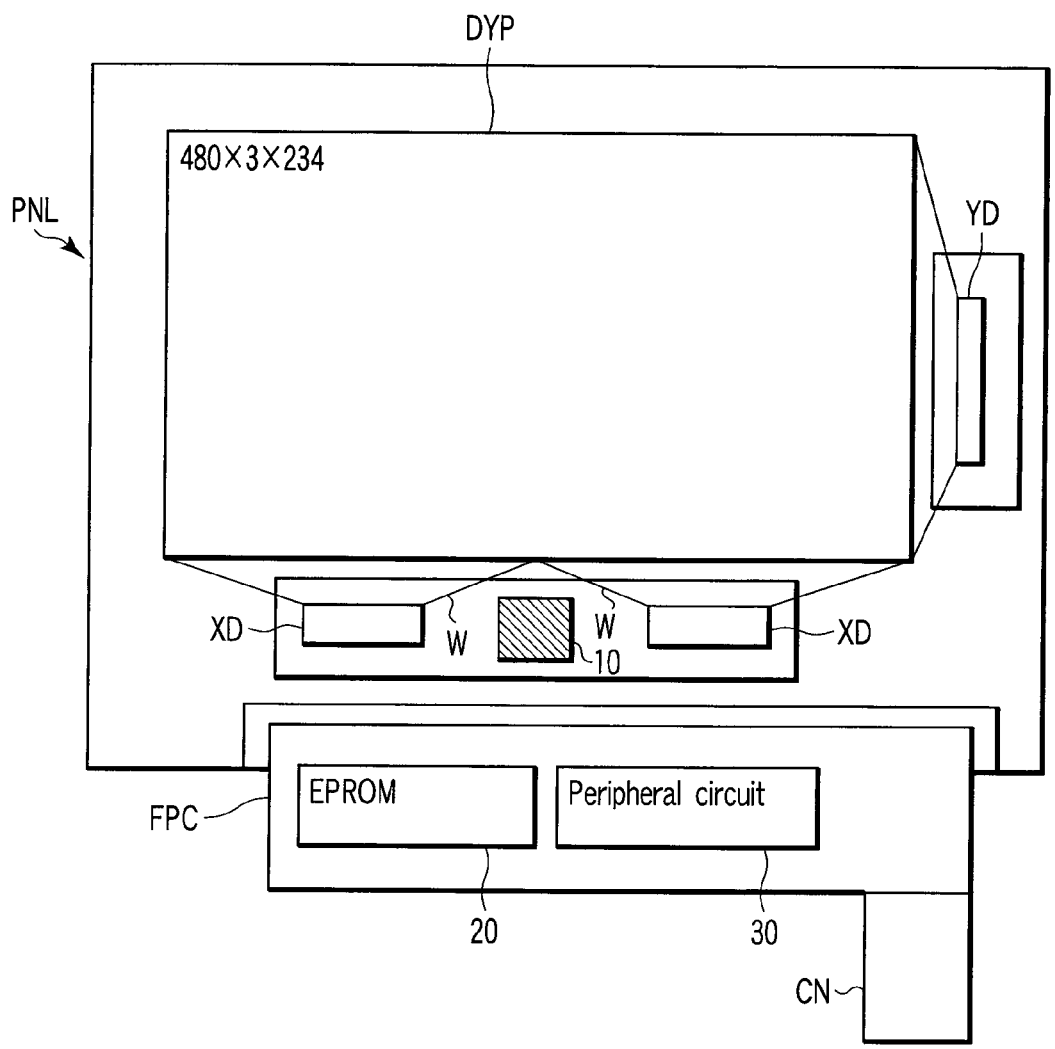
FIG. 4 schematically shows an example of the structure of a liquid crystal display device according to a second embodiment of the present invention.

As shown in FIG. 4, the liquid crystal display device according to this embodiment includes a liquid crystal display panel PNL. A circuit board CB is electrically connected to one end portion of the liquid crystal display panel PNL via a flexible board FPC. In the liquid crystal display device according to this embodiment, an EPROM, a peripheral circuit and a connector CN are mounted on the flexible board FPC.

Like the liquid crystal display device of the first embodiment, a driving circuit and a system IC 10 are disposed on a peripheral region which surrounds the display section DYP. The driving circuit includes a scanning line driving circuit YD which is connected to the scanning lines, and a signal line driving circuit XD which is connected to the signal lines. In the liquid crystal display device according to this embodiment, one scanning line driving circuit YD and two signal line driving circuit XD are disposed on the peripheral region.

The system IC 10 is disposed between the two signal line driving circuits XD. Specifically, a plurality of connection wiring lines W are disposed between the signal line driving circuits XD and the display section DYP. These plural connection wiring lines W extend from the signal line driving circuits XD and are connected to the signal lines of the display section DYP. The system IC 10 is disposed on a region between the signal line driving circuits XD, where the connection wiring lines W are not disposed.

As has been described above, according to the liquid crystal display device of the present embodiment, the same advantageous effects as with the liquid crystal display device of the above-described first embodiment, can be obtained. Specifically, the number of components, which are necessary for the fabrication of the liquid crystal display device, can be reduced, and thereby the reduction in manufacturing cost and the improvement in the reliability can be realized.

Figure 5:
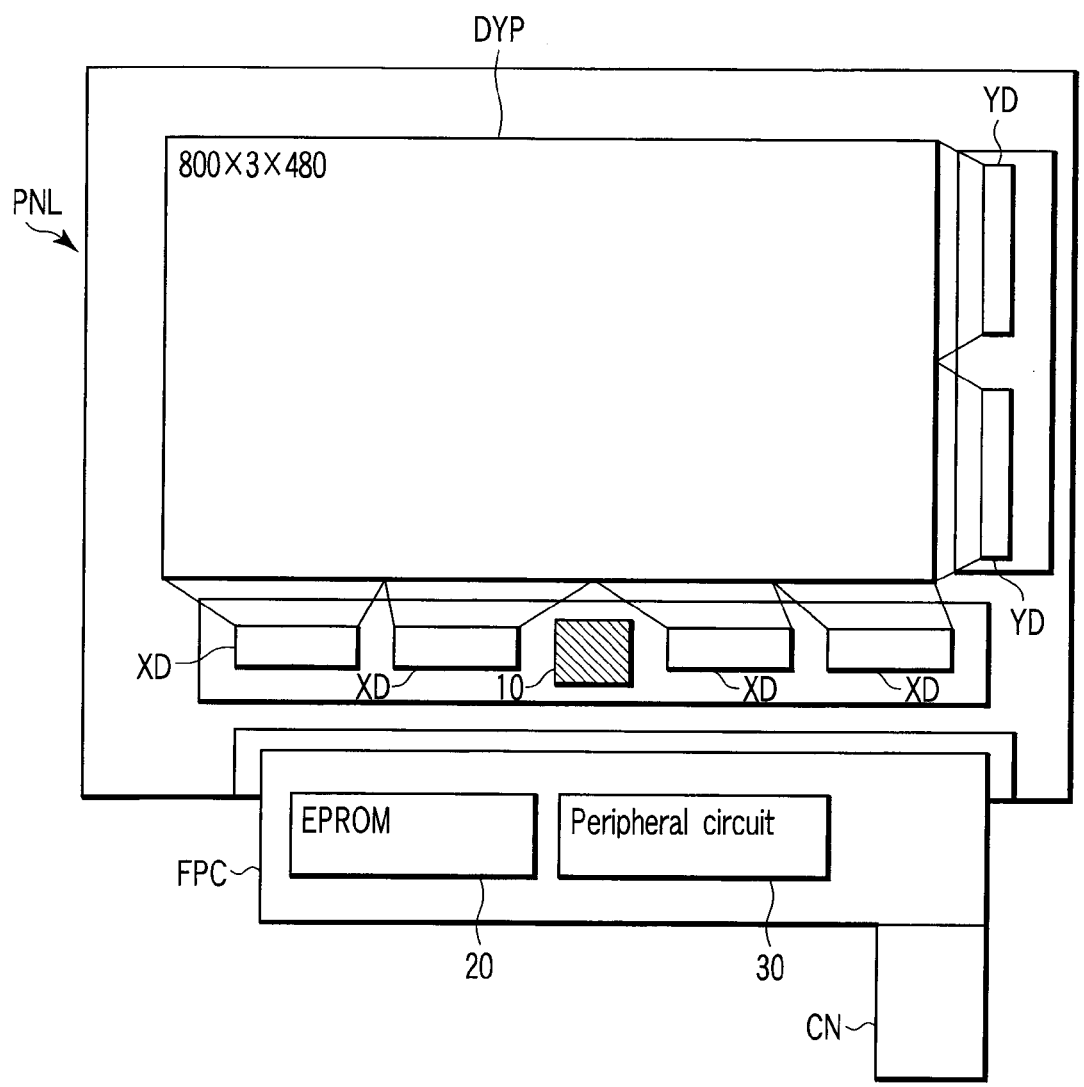
FIG. 5 schematically shows another example of the structure of the liquid crystal display device according to the second embodiment of the invention.

In addition, even in the case where the system IC 10 is disposed on the peripheral region of the liquid crystal display panel PNL, there is no need to increase the size of the peripheral region. Even in the case where the number of scanning lines and the number of signal lines, which are disposed in the display section DYP, are increased as shown in FIG. 5, it should suffice if only the number of scanning line driving circuits YD and the number of signal line driving circuits XD, which are disposed on the peripheral region, are increased. There is no need to increase the number of controllers CNT and the number of power supply circuits DD.

Moreover, in the liquid crystal display device according to this embodiment, since the EPROM and the peripheral circuit are mounted on the flexible board FPC, the circuit board can be dispensed with, and the number of components can be more reduced than in the liquid crystal display device of the first embodiment.

Therefore, the present embodiment can provide a liquid crystal display device wherein the number of components, which are necessary for the fabrication of the liquid crystal display device, can be more reduced than in the liquid crystal display device of the first embodiment, and thereby the reduction in manufacturing cost and the improvement in the reliability can be realized.

The present invention is not limited directly to the above-described embodiments. In practice, the structural elements can be modified without departing from the spirit of the invention. For example, the present invention is applicable to display devices, other than liquid crystal display devices, if a display period and a non-display period are provided in such display devices.

For example, in the liquid crystal display device according to each of the above-described embodiments, the system IC is disposed between the two signal line driving circuits XD. Alternatively, the system IC may be disposed between two scanning line driving circuits YD. In this case, too, the same advantageous effects as with the above-described embodiments can be obtained. Besides, the EPROM may be built in the system IC.

Various inventions can be made by properly combining the structural elements disclosed in the embodiments. For example, some structural elements may be omitted from all the structural elements disclosed in the embodiments. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a liquid crystal display panel including a pair of mutually opposed substrates, a display section which is composed of a plurality of matrix-arrayed display pixels, and a peripheral region surrounding the display section;
   a driving circuit configured to drive the display pixels, and including a plurality of circuit sections which are disposed on the peripheral region;
   a controller configured to control the driving circuit; and
   a power supply circuit configured to supply power to the driving circuit and the controller,
   wherein the controller and the power supply circuit are built in a 1-chip system IC without the driving circuit and are disposed on the peripheral region.

2. The liquid crystal display device according to claim 1, further comprising a flexible board which is connected to the peripheral region, wherein a peripheral circuit, which is necessary for the system IC, is mounted on the flexible board.

3. The liquid crystal display device according to claim 1, wherein the system IC is disposed on the peripheral region along an end side of the display section, and is positioned near a center of the end side.

4. The liquid crystal display device according to claim 1, wherein the system IC is COG-mounted on one of the pair of substrates.

* * * * *